(12) United States Patent  (10) Patent No.: US 8,496,371 B2
Chang et al.  (45) Date of Patent: Jul. 30, 2013

(54) BACKLIGHT MODULE

(75) Inventors: Chia-Hao Chang, Hsinchu (TW);
Ching-Yuan Chung, Hsinchu (TW)

(73) Assignee: Young Lighting Technology Corporation, Hsin-Chu (TW)

( * ) Notice: Subject to any disclaimer, the term of this patent is extended or adjusted under 35 U.S.C. 154(b) by 253 days.

(21) Appl. No.: 13/088,682

(22) Filed: Apr. 18, 2011

(65) Prior Publication Data

US 2011/0273902 A1  Nov. 10, 2011

(30) Foreign Application Priority Data

May 5, 2010 (TW) ................................. 99114314 A

(51) Int. Cl.
*F21V 7/04* (2006.01)
(52) U.S. Cl.
USPC .......... 362/629; 362/23.1; 362/606; 362/616; 362/627; 349/65; 40/546; 40/572
(58) Field of Classification Search
USPC .............. 40/546, 547, 572; 349/65; 362/23.1, 362/23.17, 606, 613, 616, 627–629
See application file for complete search history.

(56) References Cited

U.S. PATENT DOCUMENTS

2005/0243578 A1  11/2005 Lee et al.
2009/0268483 A1 *  10/2009 Donahue ....................... 362/627

FOREIGN PATENT DOCUMENTS

TW   534325  Y  5/2003
TW   I259312     8/2006
TW   M341284    9/2008

* cited by examiner

*Primary Examiner* — Stephen F Husar
(74) *Attorney, Agent, or Firm* — Muncy, Geissler, Olds & Lowe, PLLC

(57) ABSTRACT

A backlight module includes a light guide plate and at least one light source. The light guide plate has a first light-emitting surface, a second light-emitting surface opposite the first light-emitting surface, and at least one side surface connected between the first light-emitting surface and the second light-emitting surface. The light guide plate has a first substance and a second substance surrounding the first substance, and the second substance is different to the first substance to form at least a first light reflecting/diffusing interface and a second light reflecting/diffusing interface. A light beam emitted by the light source is deflected by the first light reflecting/diffusing interface and output via the first light-emitting surface, and a light beam emitted by the light source is deflected by the second light reflecting/diffusing interface and output via the second light-emitting surface.

14 Claims, 5 Drawing Sheets

BACKLIGHT MODULE

BACKGROUND OF THE INVENTION a. Field of the Invention

The invention relates to a backlight module and, more particularly, to a double-sided backlight module.

b. Description of the Related Art

Referring to FIG. 4, the backlight module 100 includes two separate light-guiding devices 102 and 104. The light-guiding devices 102 and 104 are mounted back to back to provide double-sided light emissions. However, the combination of the two separate light-guiding devices 102 and 104 may result in considerable fabrication costs, occupied space, weight, and thickness. Hence, some prior designs are proposed to solve this problem. For example, as shown in FIG. 5, Taiwan patent no. M341284 discloses a backlight module 200 having two light guide plates 202 and 204. The light guide plates 202 and 204 overlap with each other to reduce the overall volume and thickness of the backlight module 200, and optical films 206 and 208 are respectively disposed on one side of the light guide plate 202 and one side of the light guide plate 204. Further, Taiwan patent no. 1259312 also discloses a backlight module. The backlight module has a light guide plate, two diffusion sheets respectively disposed on two light-emitting sides of the light guide plate, and light-emitting diodes disposed on a light incident side of the light guide plate to obtain double-sided light emissions.

However, the above designs fail to provide a backlight module having lower fabrication costs, reduced thickness, simplified fabrication processes, and competent luminous uniformity.

BRIEF SUMMARY OF THE INVENTION

The invention provides a backlight module having at least one advantages of low fabrication costs, reduced thickness, simplified fabrication processes, and high luminous uniformity.

Other objects and advantages of the invention may be further illustrated by the technical features broadly embodied and described as follows.

In order to achieve one or a portion of or all of the objects or other objects, one embodiment of the invention provides a backlight module. The backlight module includes a light guide plate, a first light source, and a second light source. The light guide plate has a first light-emitting surface, a second light-emitting surface opposite the first light-emitting surface, and at least a first side surface and a second side surface connected between the first light-emitting surface and the second light-emitting surface. The light guide plate has a first substance and a second substance surrounding the first substance, and the second substance is different to the first substance to form a first light reflecting/diffusing interface and a second light reflecting/diffusing interface adjacent to the first light-emitting surface and to form a third light reflecting/diffusing interface and a fourth light reflecting/diffusing interface adjacent to the second light-emitting surface. The first light source is disposed adjacent to the first side surface. A light beam emitted by the first light source is deflected by the first light reflecting/diffusing interface and output via the first light-emitting surface, and a light beam emitted by the first light source is deflected by the third light reflecting/diffusing interface and output via the second light-emitting surface. A second light source is disposed adjacent to the second side surface. A light beam emitted by the second light source is deflected by the second light reflecting/diffusing interface and output via the first light-emitting surface, and a light beam emitted by the second light source is deflected by the fourth light reflecting/diffusing interface and output via the second light-emitting surface.

In one embodiment, the first substance includes light-diffusing plastic, and the second substance includes transparent plastic.

In one embodiment, the first substance includes air, and the second substance includes transparent plastic.

In one embodiment, each of the first light reflecting/diffusing interface, the second light reflecting/diffusing interface, the third light reflecting/diffusing interface, and the fourth light reflecting/diffusing interface comprises at least one of a curve surface and a planar surface.

In one embodiment, a first distance between the first light reflecting/diffusing interface and the first light-emitting surface and a second distance between the second light reflecting/diffusing interface and the first light-emitting surface are both gradually reduced from the periphery to the center of the first light-emitting surface, and a third distance between the third light reflecting/diffusing interface and the second light-emitting surface and a fourth distance between the fourth light reflecting/diffusing interface and the second light-emitting surface are both gradually reduced from the periphery to the center of the second light-emitting surface.

In one embodiment, a plurality of micro structures are formed on at least one of the first light-emitting surface and the second light-emitting surface.

In one embodiment, a plurality of micro structures are formed on at least one of the first light reflecting/diffusing interface, the second light reflecting/diffusing interface, the third light reflecting/diffusing interface, and the fourth light reflecting/diffusing interface.

According to another embodiment of the invention, a backlight module includes a light guide plate and at least one light source. The light guide plate has a first light-emitting surface, a second light-emitting surface opposite the first light-emitting surface, and at least one side surface connected between the first light-emitting surface and the second light-emitting surface. The light guide plate has a first substance and a second substance surrounding the first substance, and the second substance is different to the first substance to form at least a first light reflecting/diffusing interface and a second light reflecting/diffusing interface. The light source is disposed adjacent to the side surface. A light beam emitted by the light source is deflected by the first light reflecting/diffusing interface and output via the first light-emitting surface, and a light beam emitted by the light source is deflected by the second light reflecting/diffusing interface and output via the second light-emitting surface.

In summary, the embodiment or embodiments of the invention may have at least one of the following advantages. According to the above embodiments, different plastic materials are subject to extrusion molding to form multiple light-guiding interfaces and provide double-sided light emissions as a result. Hence, compared with a conventional double-sided backlight module, the backlight module according to the above embodiments needs only one light guide plate to reduce the overall thickness, volume, weight, and waste of material of an assembled backlight module to obtain a low-cost, light, and thin double-sided light-emitting device. In a typical process of the fabrication of a conventional double-sided backlight module, a large plate used in offset printing is cut to form the base of a light guide plate. However, such cutting process may result in a considerable waste of plate material, and the entire fabrication process is complicated since the preparation of dot ink and the stability of ink printing may be taken into consideration. However, since the backlight module according to the above embodiments is made by extrusion molding, such extrusion molding process may naturally form smooth mirror surfaces, and hence only two facets cut at two sides of a light guide plate need to be polished. In that case, the production yield is improved, and a simpler uniaxial extrusion molding process may be used to further reduce fabrication costs. Besides, according to the above embodiments, the display brightness is allowed to be locally adjusted, and the luminous uniformity is improved, by varying the refraction index of materials and slopes or curvatures of the light reflecting/diffusing interfaces.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
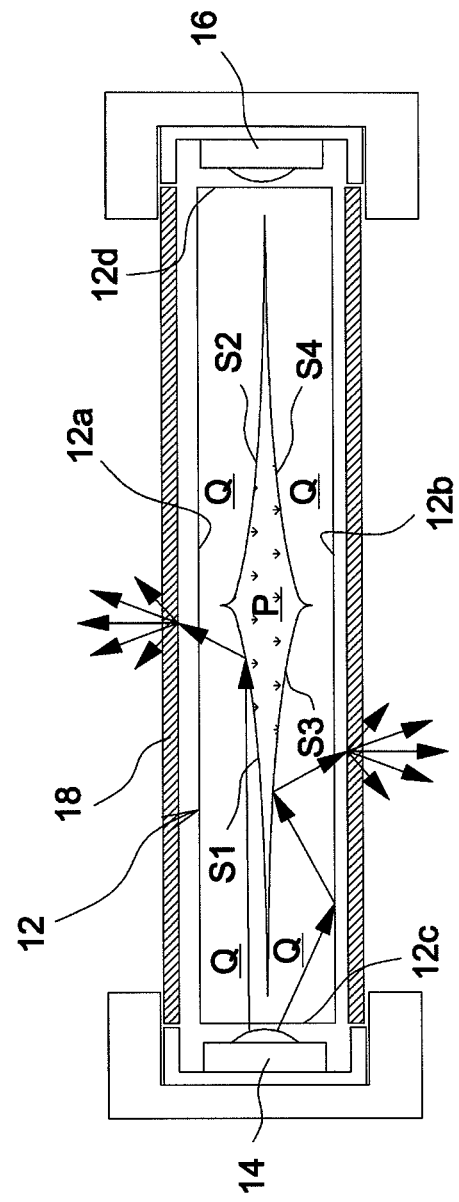
FIG. 1 shows a schematic diagram of a backlight module according to an embodiment of the invention.

Referring to FIG. 1, a backlight module 10 includes a light guide plate 12, a first light source 14, and a second light source 16. The light guide plate 12 has a first light-emitting surface 12a, a second light-emitting surface 12b opposite the first light-emitting surface 12a, and at least a first side surface 12c and a second side surface 12d connected between the first light-emitting surface 12a and the second light-emitting surface 12b. The first light source 14 is disposed adjacent to the first side surface 12c, and the second light source 16 is disposed adjacent to the second side surface 12d. Each of the first light source 14 and the second light source 16 may be a light-emitting diode (LED) assembly. The light guide plate 12 includes a first substance P and a second substance Q surrounding the first substance P. The first substance P is different to the second substance Q to form a first light reflecting/diffusing interface S1 and a second light reflecting/diffusing interface S2 adjacent to the first light-emitting surface 12a and to form a third light reflecting/diffusing interface S3 and a fourth light reflecting/diffusing interface S4 adjacent to the second light-emitting surface 12b. In this embodiment, the first substance P is light-diffusing plastic capable of scattering a light beam, and the second substance Q is transparent plastic. A light beam emitted by the first light source 14 is deflected by the first light reflecting/diffusing interface S1 and then output via the first light-emitting surface 12a. A light beam emitted by the first light source 14 is deflected by the third light reflecting/diffusing interface S3 and then output via the second light-emitting surface 12b. A light beam emitted by the second light source 16 is deflected by the second light reflecting/diffusing interface S2 and then output via the first light-emitting surface 12a. A light beam emitted by the second light source 16 is deflected by the fourth light reflecting/diffusing interface S4 and then output via the second light-emitting surface 12b. Each of the light reflecting/diffusing interfaces S1-S4 may be a curve surface. In one embodiment, a first distance between the first light reflecting/diffusing interface S1 and the first light-emitting surface 12a and a second distance between the second light reflecting/diffusing interface S2 and the first light-emitting surface 12a are both gradually reduced from the periphery of the first light-emitting surface 12a to the center of the first light-emitting surface 12a. In one embodiment, a third distance between the third light reflecting/diffusing interface S3 and the second light-emitting surface 12b and a fourth distance between the fourth light reflecting/diffusing interface S4 and the second light-emitting surface 12b are both gradually reduced from the periphery of the second light-emitting surface 12b to the center of the second light-emitting surface 12b. In one embodiment, an optical film 18 such as a diffusion sheet or a brightness enhancement film may be disposed on the light guide plate 12.

The embodiment or the embodiments of the invention may have at least one of the following advantages. According to the above embodiments, different plastic materials are subject to extrusion molding to form multiple light-guiding interfaces and provide double-sided light emissions as a result. Hence, compared with a conventional double-sided backlight module, the backlight module 10 may use only one light guide plate to reduce the overall thickness, volume, weight, and waste of material of an assembled backlight module. Accordingly, a low-cost, light, and thin double-sided light-emitting device is obtained. In a typical process of the fabrication of a conventional double-sided backlight module, a large plate used in offset printing is cut to form the base of a light guide plate. However, such cutting process may result in a considerable waste of plate material, and the entire fabrication process is complicated since the preparation of dot ink and the stability of ink printing may be taken into consideration. However, since the backlight module 10 is made by extrusion molding, such extrusion molding process may naturally form smooth mirror surfaces, and hence only two facets cut at two sides of a light guide plate need to be polished. In that case, the production yield is improved, and a simpler uniaxial extrusion molding process may be used to further reduce fabrication costs. Besides, according to the above embodiments, the display brightness is allowed to be locally adjusted, and the luminous uniformity is improved, by varying the refraction index of materials and curvatures of the light reflecting/diffusing interfaces S1-S4.

Figure 2:
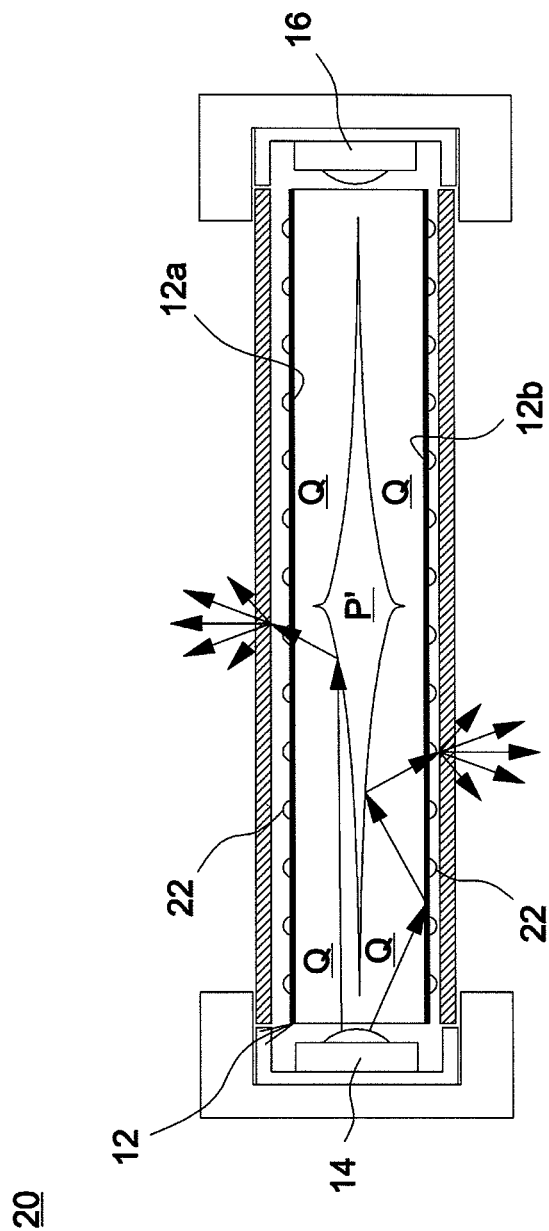
FIG. 2 shows a schematic diagram of a backlight module according to another embodiment of the invention.

In the backlight module 20 shown in FIG. 2, a plurality of micro structures 22 are formed on at least one of the first light-emitting surface 12a and the second light-emitting surface 12b. In that case, the amount of light emission of any specified local area may be adjusted by varying the size, interval, shape or refraction index of the micro structures 22. Accordingly, the display brightness is allowed to be locally adjusted, and the luminous uniformity of each light-emitting surface is improved. Further, the first substance P' and the second substance Q are not limited to a specific material, as long as the first substance P' and the second substance Q are different to each other to form a light reflecting/diffusing interface. For example, in the backlight module 20, the first substance P' is air, and the second substance Q is a transparent material.

Figure 3:
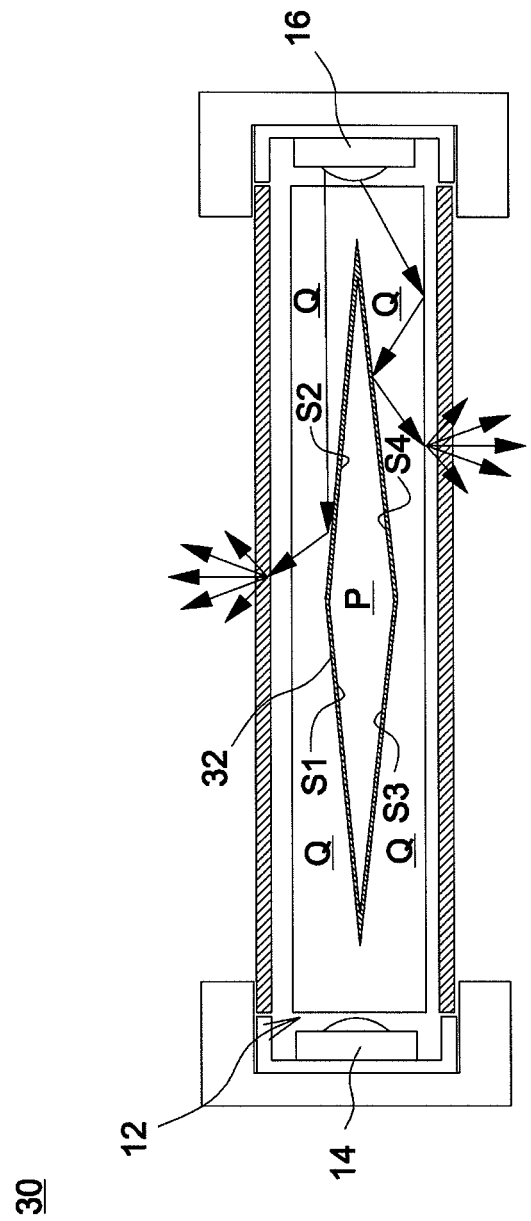
FIG. 3 shows a schematic diagram of a backlight module according to another embodiment of the invention.
Figure 4:
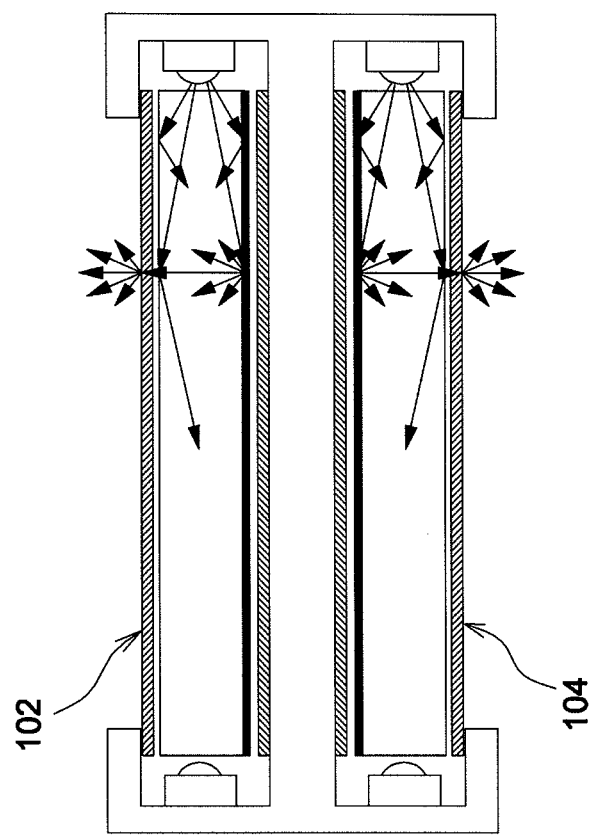
FIG. 4 shows a schematic diagram of a conventional backlight module.
Figure 5:
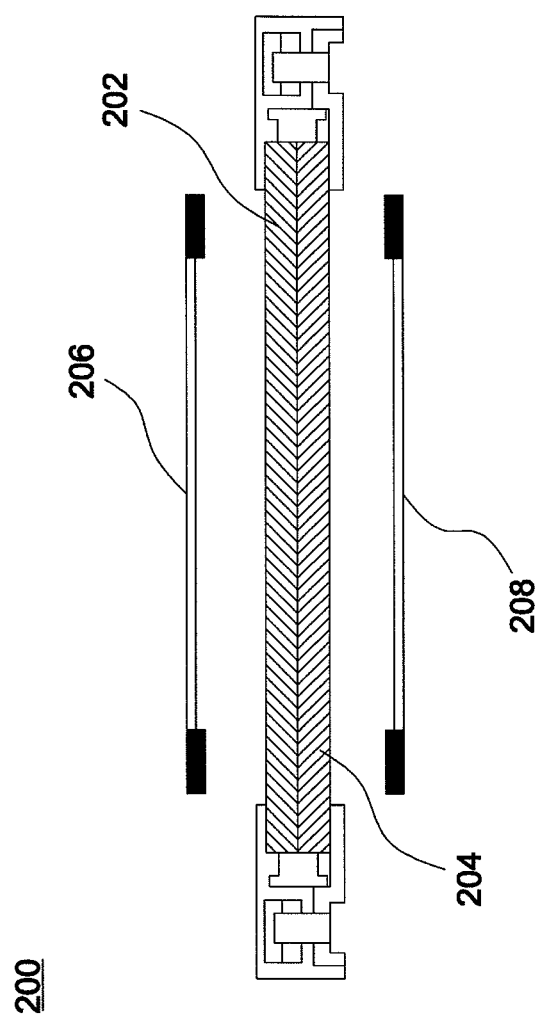
FIG. 5 shows a schematic diagram of another conventional backlight module.

In the backlight module 30 shown in FIG. 3, a plurality of micro structures 32 are formed on the light reflecting/diffusing interfaces S1-S4, and the light reflecting/diffusing interfaces S1-S4 are planar surfaces. Similarly, the display brightness is allowed to be locally adjusted, and the luminous uniformity of each light-emitting surface is improved, by varying the refraction index of materials and slopes of the light reflecting/diffusing interfaces S1-S4.

Besides, in one embodiment, each of the light reflecting/diffusing interfaces S1-S4 may include a combination of a planar surface and a curved surface according to design requirements. By varying the refraction index of materials, the slope of a planar surface or the curvature of a curved surface, the display brightness is allowed to be locally adjusted to conform to a user's demand, and the luminous uniformity of each light-emitting surface is improved.

Further, though the light guide plate 12 in the above embodiments has two light sources respectively disposed on two sides of the light guide plate 12, this is not limited. For example, the light guide plate 12 may have only one light source and one set of light reflecting/diffusing interfaces S1 and S3 (or S2 and S4). Light beams emitted by the single light source are deflected towards the first light-emitting surface 12a and the second light-emitting surface 12b to similarly obtain double-sided light emissions.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A backlight module, comprising:
a light guide plate comprising a first light-emitting surface, a second light-emitting surface opposite the first light-emitting surface, and at least a first side surface and a second side surface connected between the first light-emitting surface and the second light-emitting surface, wherein the light guide plate comprises a first substance and a second substance surrounding the first substance, and the second substance is different to the first substance to form a first light reflecting/diffusing interface and a second light reflecting/diffusing interface adjacent to the first light-emitting surface and to form a third light reflecting/diffusing interface and a fourth light reflecting/diffusing interface adjacent to the second light-emitting surface;
a first light source disposed adjacent to the first side surface, wherein a light beam emitted by the first light source is deflected by the first light reflecting/diffusing interface and output via the first light-emitting surface, and a light beam emitted by the first light source is deflected by the third light reflecting/diffusing interface and output via the second light-emitting surface; and
a second light source disposed adjacent to the second side surface, wherein a light beam emitted by the second light source is deflected by the second light reflecting/diffusing interface and output via the first light-emitting surface, and a light beam emitted by the second light source is deflected by the fourth light reflecting/diffusing interface and output via the second light-emitting surface.

2. The backlight module as claimed in claim 1, wherein the first substance comprises light-diffusing plastic, and the second substance comprises transparent plastic.

3. The backlight module as claimed in claim 1, wherein the first substance comprises air, and the second substance comprises transparent plastic.

4. The backlight module as claimed in claim 1, wherein each of the first light reflecting/diffusing interface, the second light reflecting/diffusing interface, the third light reflecting/diffusing interface, and the fourth light reflecting/diffusing interface comprises at least one of a curve surface and a planar surface.

5. The backlight module as claimed in claim 1, wherein a first distance between the first light reflecting/diffusing interface and the first light-emitting surface and a second distance between the second light reflecting/diffusing interface and the first light-emitting surface are both gradually reduced from the periphery of the first light-emitting surface to the center of the first light-emitting surface, and a third distance between the third light reflecting/diffusing interface and the second light-emitting surface and a fourth distance between the fourth light reflecting/diffusing interface and the second light-emitting surface are both gradually reduced from the periphery of the second light-emitting surface to the center of the second light-emitting surface.

6. The backlight module as claimed in claim 1, further comprising a plurality of micro structures formed on at least one of the first light-emitting surface and the second light-emitting surface.

7. The backlight module as claimed in claim 1, further comprising a plurality of micro structures formed on at least one of the first light reflecting/diffusing interface, the second light reflecting/diffusing interface, the third light reflecting/diffusing interface, and the fourth light reflecting/diffusing interface.

8. The backlight module as claimed in claim 1, wherein each of the first light source and the second light source comprises a light-emitting diode assembly.

9. A backlight module, comprising:
a light guide plate having a first light-emitting surface, a second light-emitting surface opposite the first light-emitting surface, and at least one side surface connected between the first light-emitting surface and the second light-emitting surface, wherein the light guide plate comprises a first substance and a second substance surrounding the first substance, the first substance comprises light-diffusing plastic, the second substance comprises transparent plastic, and the second substance is different to the first substance to form at least a first light reflecting/diffusing interface and a second light reflecting/diffusing interface; and
at least one light source disposed adjacent to the side surface, wherein a light beam emitted by the light source is deflected by the first light reflecting/diffusing interface and output via the first light-emitting surface, and a light beam emitted by the light source is deflected by the second light reflecting/diffusing interface and output via the second light-emitting surface.

10. The backlight module as claimed in claim 9, wherein each of the first light reflecting/diffusing interface and the second light reflecting/diffusing interface comprises at least one of a curve surface and a planar surface.

11. The backlight module as claimed in claim 9, wherein a first distance between the first light reflecting/diffusing interface and the first light-emitting surface is gradually reduced from the periphery of the first light-emitting surface to the center of the first light-emitting surface, and a second distance between the second light reflecting/diffusing interface and the second light-emitting surface is gradually reduced from the periphery of the second light-emitting surface to the center of the second light-emitting surface.

12. The backlight module as claimed in claim 9, further comprising a plurality of micro structures formed on at least one of the first light-emitting surface and the second light-emitting surface.

13. The backlight module as claimed in claim 9, further comprising a plurality of micro structures formed on at least one of the first light reflecting/diffusing interface and the second light reflecting/diffusing interface.

14. The backlight module as claimed in claim 9, wherein the light source comprises a light-emitting diode assembly.

* * * * *